Patented Jan. 8, 1946

2,392,589

UNITED STATES PATENT OFFICE 2,392,589

COMPOSITIONS OF MATTER AND METHODS AND STEPS OF MAKING AND USING THE SAME

Mortimer T. Harvey, South Orange, N. J., assignor to Harvel Research Corporation, a corporation of New Jersey No Drawing. Application April 26, 1943, Serial No. 484,598

16 Claims. (Cl. 260—36)

This invention relates to novel products and to methods for preparing the same. In one of its specific aspects the invention is directed to novel gels and millable and cured compositions. This application is a continuation in part of my copending application Serial No. 327,057, filed March 20, 1940.

Prior to this invention, I have produced normally liquid organic condensation reaction products by reacting a tertiary alkyl alcohol with formaldehyde in the presence of an acidic catalyst. The liquid products obtained by this reaction are specifically set forth in my copending applications 461,597, filed October 10, 1942; 461,598, filed October 10, 1942; and 461,599, filed October 10, 1942, all of which are hereby made part of this application. The tertiary alkyl alcohols which I prefer to employ in the practice of the present invention are tertiary amyl alcohol, tertiary butyl alcohol and tertiary hexyl alcohol. In the course of my experimentations, I have found that said normally liquid organic condensation reaction products and particularly those disclosed in said applications may be employed to produce gels with normally solid resins which are polymers and copolymers of vinyl compounds. Among the resins employed were the polymers of vinyl chloride, vinyl acetate, vinyl chloracetate and vinyl acetals, such as vinyl butyral and the copolymers of vinyl chloride and vinyl acetate. When available, I prefer to employ those resins which have molecular weights above 20,000 and in some cases I have used some having molecular weights of 40,000. I have discovered that I may produce a solution of said normally liquid organic condensation products and said vinyl resins by elevating the temperature of a mixture thereof and that upon cooling said solution is a gel at 70° F. This gel is essentially a dispersion of the solid resin in said normally liquid organic condensation reaction product. The ratio of the quantity by weight of said vinyl resin to the quantity by weight of the normally liquid organic condensation product in said gel may vary over wide limits, depending upon the type of gel desired. Generally, the stiffness or rigidity of the gel may be controlled by varying this ratio, and the stiffness and rigidity characteristic is directly proportional to this ratio, i. e., the higher this ratio the stiffer and more rigid the gel. Thus very stiff and rigid compositions of matter may be produced. Solid rubber-like resilient gels may be produced in this manner by employing between about 1 to twenty-five parts of one of said normally liquid organic condensation products to each part of said vinyl resin.

A commercially practical method for producing these liquid organic condensation reaction products is to react a tertiary alkyl alcohol and formaldehyde in the presence of an acidic catalyst. In carrying out this process, between 1 to 8 molecular proportions and preferably between 3 to 8 molecular proportions of formaldehyde are used for each molecular proportion of the tertiary alkyl alcohol. The commercially available aqueous solution of formaldehyde containing 37.5 to 40% formaldehyde is employed. The quantity of acid is preferably very low and is preferably between .01 mole to .1 mole per mole of tertiary alkyl alcohol.

The following Examples 1–15 inclusive illustrate the specific manner of preparing some of said organic condensation reaction products and are given for the purposes of illustration:

*Example 1.*—Two moles of formaldehyde and one mole of tertiary butyl alcohol at atmospheric pressure.

| | Grams |
|---|---|
| 40% water solution formaldehyde | 425 |
| Tertiary butyl alcohol | 185 |
| Sulphuric acid (conc.) | 61 |
| Water | 61 |

The above four materials in the amounts stated were dissolved together and refluxed for about six hours. No formaldehyde was detected after the reaction. The mix separated into an oily layer (a) and a water layer (b). The oily layer was neutralized, separated from the water layer and distilled at about 150° C. to remove water and lower boiling point material. The resulting oily product had a specific gravity greater than 1 and is hereinafter referred to as product A.

*Example 2.*—Two moles of formaldehyde and one mole of tertiary butyl alcohol at a pressure of about one hundred pounds.

| | Grams |
|---|---|
| 40% water solution formaldehyde | 680 |
| Tertiary butyl alcohol | 300 |
| Sulphuric acid (conc.) | 10 |
| Water | 10 |

The above four materials, in the amounts stated, were dissolved together, placed in an autoclave and heated at a pressure of about one hundred pounds per square inch for about three hours. The mass separated into an oily layer (a) and a water layer (b). The oily layer was then neutralized, separated from the water layer and distilled at about 150° C. This resultant oily product is hereinafter referred to as product B. Fractions taken between 200° C. and 270° C. had specific gravities of from 1.03 to 1.06.

*Example 3.*—Three moles of formaldehyde and one mole of tertiary butyl alcohol, at atmospheric pressure.

|  | Grams |
|---|---|
| A 40% water solution of formaldehyde | 765 |
| Tertiary butyl alcohol | 222 |
| Sulphuric acid (conc.) | 100 |
| Water | 100 |

The above four materials, in the stated amounts, were dissolved together and heated under a reflux condenser for about three hours, at which time all traces of formaldehyde had disappeared. The reaction mixture was neutralized with about eighty grams of sodium hydroxide, and the reaction products which rose to the top as an oily layer were separated from the bottom layer of salt solution. This oily layer was dehydrated and distilled in vacuum (about 10 mm. of mercury) to drive off substantially all products having boiling points below 150° C. The residual oily layer is hereinafter referred to as product C. A cut which distilled between 215° C. and 280° C. had a specific gravity of 1.09.

*Example 4.*—Three moles of formaldehyde and one mole of tertiary butyl alcohol at atmospheric pressure.

|  | Grams |
|---|---|
| A 40% water solution of formaldehyde | 255 |
| Tertiary butyl alcohol | 74 |
| Hydrochloric acid | 10 |

The above three materials, in the stated amounts, were heated under a reflux condenser for about six hours. After separating and neutralizing the reaction layer, it was dehydrated and distilled at about 160° C. The residual oily product is hereinafter referred to as product D. A cut distilling between 175° C. and 260° C. gave on analysis.

| C | per cent | 58.27 |
|---|---|---|
| H | do | 9.62 |
| O | per cent (by difference) | 32.11 |

*Example 5.*—Three moles of formaldehyde and one mole of tertiary butyl alcohol at atmospheric pressure.

|  | Grams |
|---|---|
| A 40% water solution of formaldehyde | 765 |
| Tertiary butyl alcohol | 222 |
| Sulphuric acid (conc.) | 50 |
| Water | 50 |

The above four materials, in the amounts stated, were heated under a reflux condenser for about six hours, at which time all traces of formaldehyde had disappeared. After neutralizing the reaction mixture, an upper oily layer was separated from the bottom water layer containing the salts formed by neutralization, dehydrated and distilled at about 150° C. The resulting oily product is hereinafter referred to as product E. A cut taken between 230° C. and 260° C. (atmospheric pressure) gave the following analysis:

| C | per cent | 57.46 |
|---|---|---|
| H | do | 9.28 |
| O | per cent (by difference) | 33.26 |

This approximates the empirical formula of $C_9H_{18}O_4$.

*Example 6.*—Three moles of formaldehyde and one mole of tertiary butyl alcohol at about one hundred pounds pressure per square inch.

|  | Grams |
|---|---|
| A 40% water solution of formaldehyde | 765 |
| Tertiary butyl alcohol | 222 |
| Sulphuric acid (conc.) | 2.5 |
| Water | 2.5 |

The above four materials, in the stated amounts, were heated under a reflux condenser for about three hours, then neutralized and the oily top layer separated, dehydrated and distilled similarly to the treatment in the above examples. The resulting oily layer is hereinafter referred to as product F.

*Example 7.*—About four moles of formaldehyde and one mole of tertiary butyl alcohol.

About eighty (80) pounds of formaldehyde (about 40% water solution), eighteen (18) pounds of tertiary butyl alcohol, and sixty-six (66) cubic centimeters of concentrated sulphuric acid were heated in a closed container at a pressure of about 100 to 140 pounds for about two hours. The mass separated into an oily layer (a) and a water layer (b). The oily layer (a) was removed therefrom, neutralized and distilled at 150° C. The resulting oily product is hereinafter referred to as product G.

*Example 8.*—About three moles of formaldehyde and one mole of tertiary amyl alcohol.

About sixty-three and one-half (63.5) pounds of a 37% solution of formaldehyde in water, twenty-four (24) pounds of tertiary amyl alcohol, and fifty-five (55) cubic centimeters of concentrated sulphuric acid were heated at about one hundred (100) pounds pressure for from one to two hours, after which the oil-like layer was removed from the water layer and dehydrated by heating to 300° F. The resulting oily product is hereinafter referred to as product H.

*Example 9.*—One mole of tertiary amyl alcohol and one mole of formaldehyde at atmospheric pressure. About

|  | Grams |
|---|---|
| Tertiary amyl alcohol | 88 |
| 40% solution of formaldehyde in water | 85 |
| 50% sulphuric acid | 40 | were heated together to ebullition under a reflux condenser until a reddish oil layer came to the top and the odor of the formaldehyde disappeared. This top layer was separated and neutralized with dry sodium hydroxide. The neutralized product was insoluble in water, contained a little unreacted tertiary amyl alcohol and had a specific gravity of 0.882. The neutralized product was distilled at atmospheric pressure, distillation commencing at 82° C. From 82° C. to 135° C. a total of 45 grams was distilled. From 135° C. to 193° C. a total of 33 grams was distilled. The residual product after distillation at 150° C. is hereinafter referred to as product I. The fraction between 135° C. and 193° C. was soluble in water, alcohol and benzene, insoluble in gasoline, and was a solvent for cellulose acetate.

*Example 10.*—One mole of formaldehyde and one mole of tertiary amyl alcohol at one hundred pounds pressure. About

| Formaldehyde solution (37½% by weight) | grams | 480 |
|---|---|---|
| Tertiary amyl alcohol | do | 528 |
| Sulphuric acid (conc.) | cubic centimeters | 5.5 |

The acid and formaldehyde solution were mixed together and then the tertiary amyl alcohol was added, in an autoclave. The mixture was heated till the gauge indicated a pressure of 100 pounds per square inch. The pressure tended to rise rapidly at this point, indicating an exothermic reaction. Application of heat was stopped till reaction subsided and pressure commenced to drop. Heat was then re-applied and the burner regulated so as to maintain the pressure at 100 pounds per square inch for one hour. The mixture was cooled and when the autoclave was opened, it was found that the odor of formaldehyde had disappeared. The contents had separated into two layers. Dilute sodium hydroxide solution was added till aqueous layer was neutral and sodium chloride was added to saturation of aqueous layer. The oil layer was then separated. This oily layer was subjected to distillation and a first cut taken up to 88° C. The residue, containing some water, was dehydrated by distillation to 135° C. This also removed any unreacted tertiary amyl alcohol, which boils at 102° C. The distillate separated into two layers, of which the oil layer amounted to 42 grams. The water-free residue, hereinafter referred to as product J and boiling above 135° C., amounted to 350 grams. It was a light-colored, slightly viscous oil, specific gravity 1.03 at 25° C., soluble in water, alcohol and benzene, insoluble in gasoline. It was a quick solvent for cellulose acetate. Upon distillation at atmospheric pressure this oil distilled over almost completely up to 260° C. leaving almost no residue.

*Example 11.*—One mole of tertiary amyl alcohol and two moles of formaldehyde at atmospheric pressure. About

| | Grams |
|---|---|
| Tertiary amyl alcohol | 88 |
| Aqueous formaldehyde solution (37½% by weight) | 170 |
| 50% sulphuric acid | 60 | were mixed together, giving a completely clear solution, and heated under a reflux condenser to ebullition. When ebullition commenced the mixture turned milky and an oil separated to the top immediately. The boiling was carried on for about forty-five minutes at which time no odor of formaldehyde was detectable. The top oil layer was separated and weighed 110 grams. This was distilled at atmospheric pressure. Distillation started at about 87° C. and up to 135° C., a total of 25 grams was distilled off. The remaining dehydrated oil hereinafter referred to as product K amounted to 85 grams and was a deep yellow, somewhat viscous oil, specific gravity (25° C.) 1.05. It was found to be soluble in water, alcohol and benzene, but insoluble in gasoline. It was a fast solvent for cellulose acetate. Upon further distillation at atmospheric pressure, it was found to distil over almost completely up to 290° C.

*Example 12.*—Three moles of formaldehyde and one mole of tertiary amyl alcohol at 100 pounds pressure.

| | | |
|---|---|---|
| Formaldehyde solution (37½% by weight) | grams | 720 |
| Tertiary amyl alcohol | do | 264 |
| Sulphuric acid (conc.) | cc | 1.33 |

The acid and formaldehyde solution were mixed together and then the tertiary amyl alcohol was added, in an autoclave. The mixture was heated till the gauge indicated a pressure of 100 pounds per square inch. The pressure tended to rise rapidly at this point indicating an exothermic reaction. Application of heat was stopped till reaction subsided and pressure commenced to drop. Heat was then re-applied and the burner regulated so as to maintain the pressure at 100 pounds per square inch for one hour. The mixture was cooled and when the autoclave was opened it was found that the odor of formaldehyde had disappeared. The contents had separated into two layers. Dilute sodium hydroxide solution was added till aqueous layer was neutral and the oil layer was then separated. This oil layer still contained water and was dehydrated by distillation to a temperature of 135° C. The residual oil hereinafter referred to as product L weighed 370 grams and had a specific gravity at atmospheric pressure of 1.075, was distilled to a vapor temperature of 285° C., and was separated into two portions: (a) distillate (290 grams) which was a pale yellow viscous oil (specific gravity of 1.16), soluble in water, alcohol and benzene, insoluble in gasoline, and it dissolved cellulose acetate quickly; (b) residue (80 grams) which was a dark brown soft pitch, soluble in alcohol and benzene, insoluble in water and gasoline, and also compatible with cellulose acetate.

*Example 13.*—One mole of tertiary hexyl alcohol and one mole of formaldehyde at one hundred pounds pressure. The tertiary hexyl alcohol used in this and the following examples was diethyl methyl carbinol with a boiling point of 123° C. About

| | | |
|---|---|---|
| Tertiary hexyl alcohol | grams | 306 |
| Formaldehyde solution (37½% by weight) | grams | 240 |
| Sulphuric acid (conc.) | cc | 3.0 | were heated together in an autoclave to 100 pounds per square inch pressure and held there for one hour. The mixture was then cooled to room temperature. No odor of formaldehyde remained. The mixture separated into two layers and was neutralized by the addition of dilute sodium hydroxide. The oil layer, amounting to 329 grams (specific gravity of 0.874 at 25° C.) was distilled to vapor temperature of 135° C. The residue, hereinafter referred to as product M and amounting to 166 grams (specific gravity 0.955) was soluble in alcohol, benzene and gasoline but insoluble in water. A portion of the residue oil distilled at atmospheric pressure gave the following results:

| Percent distilled | 10 | 20 | 30 | 40 | 50 | 60 | 70 | 80 | 90 |
|---|---|---|---|---|---|---|---|---|---|
| °C | 143 | 155 | 167 | 180 | 195 | 213 | 233 | 244 | 276 |

*Example 14.*—One mole of tertiary hexyl alcohol and three moles of formaldehyde at one hundred pounds pressure. About

| | | |
|---|---|---|
| Tertiary hexyl alcohol | grams | 306 |
| Formaldehyde solution (37½%) | do | 720 |
| Sulphuric acid (conc.) | cc | 1.5 | were heated in an autoclave to one hundred pounds per square inch pressure and held there for one hour. The mixture was then cooled to room temperature. No odor of formaldehyde remained. The mixture separated into two layers. It was then neutralized by addition of dilute sodium hydroxide and the top oily layer which separated amounted to 405 grams (specific gravity 0.992). This oil layer was then distilled to vapor temperature of 135° C. The residue hereinafter referred to as product N and amounting to 325 grams (specific gravity of 1.030) was soluble in alcohol, benzene and gasoline but insoluble in water. The distillate was also water insoluble. The residue oil, distilled at atmospheric pressure gave the following results:

| Percent distilled | 10 | 20 | 30 | 40 | 50 | 60 | 70 | 80 | 90 |
|---|---|---|---|---|---|---|---|---|---|
| °C | 175 | 194 | 210 | 225 | 242 | 253 | 263 | 280 | 300 |

*Example 15.*—One mole of tertiary hexyl alcohol and eight moles of formaldehyde at one hundred pounds pressure.

Tertiary hexyl alcohol _____ grams__ 153
Formaldehyde solution (37½%) ____do____ 960
Sulphuric acid (conc.) _____cc__ 0.75 were heated in an autoclave to one hundred pounds per square inch pressure and held there for one hour. The mixture was then cooled to room temperature and a slight odor of formaldehyde remained. The bottom oil layer was neutralized by the addition of dilute sodium hydroxide and separated, yielding 248 grams (specific gravity 1.072). This oil layer was then distilled at atmospheric pressure to a vapor temperature of 135° C. The residue hereinafter referred to as product O was a brown viscous oil weighing 181 grams (specific gravity 1.090 at 25° C.). The distillate to 135° C. was water soluble. The residue oil, distilled at atmospheric pressure gave the following results:

| Percent distilled | 10 | 20 | 30 | 40 | 50 | 60 | 70 | 80 |
|---|---|---|---|---|---|---|---|---|
| °C | 234 | 244 | 249 | 254 | 259 | 264 | 278 | 300 |

This residue oil, before distillation, was soluble in alcohol, benzene and gasoline and insoluble in water.

In all of the above examples, I prefer to distill the oily reaction products so that they contain no more than 25% thereof which boils below 135° C. and at least 50% thereof boils above 150° C.

A quantity of one or a combination of two or more of said organic condensation reaction products and preferably those having at least 75% thereof with boiling points above 130° C. and at least 50% thereof with boiling points above 150° C. produced in the aforesaid manner may be mixed with an appropriate quantity of one of said solid resins and the temperature of this mixture is elevated to between about 280° F. to 330° F. The mixture is held at this temperature until substantially complete solution takes place. Then the solution is allowed to cool and the solution becomes converted to a composition of matter which is a gel at 70° F. The following are illustrative examples of the methods employed for producing said gels, all parts being given by weight:

*Example 16.*—About 3 parts of product A are mixed with about one part of solid polymerized vinyl chloride, known to the trade as "Vinylite." This mixture is heated in order to raise the temperature thereof between 275° F. and 325° F. and maintained at said temperature until substantially complete solution takes place. Then the solution is cooled and at 70° F. is a solid rubbery mass and is a gel which is hereinafter referred to as GA.

*Example 17.*—About 2 parts of product C are mixed with about one part of solid polymerized vinyl acetate. This mixture is heated in order to raise the temperature thereof between 275° F. and 325° F. and maintained at said temperature until substantially complete solution takes place. Then the solution is cooled and at 70° F. is a solid rubbery mass and is a gel which is hereinafter referred to as CG.

*Example 18.*—About 3 parts of product F are mixed with about 1 part of solid vinyl chloracetate. This mixture is heated in order to raise the temperature thereof between 275° F. and 325° F. and maintained at said temperature until substantially complete solution takes place. Then the solution is cooled and at 70° F. is a solid rubbery mass and is a gel which is hereinafter referred to as FG.

*Example 19.*—About 3 parts of product H are mixed with about one part of solid vinyl butyral. This mixture is heated in order to raise the temperature thereof between 275° F. and 325° F. and maintained at said temperature until substantially complete solution takes place. Then the solution is cooled and at 70° F. is a solid rubbery mass and is a gel which is hereinafter referred to as HG.

*Example 20.*—About 4 parts of product L are mixed with about 1 part of a solid copolymer of vinyl acetate and vinyl chloride consisting of 95 parts of vinyl chloride and 5 parts of vinyl acetate. This mixture is heated in order to raise the temperature thereof between 275° F. and 325° F. and maintained at said temperature until substantially complete solution takes place. Then the solution is cooled and at 70° F. is a solid rubbery mass and is a gel which is hereinafter referred to as LG.

*Example 21.*—About 5 parts of product M are mixed with about 1 part of a solid copolymer of vinyl chloride and vinyl acetate consisting of 80 parts of vinyl chloride and 20 parts of vinyl acetate. This mixture is heated in order to raise the temperature thereof between 275° F. and 325° F. and maintained at said temperature until substantially complete solution takes place. Then the solution is cooled and at 70° F. is a solid rubbery mass and is a gel, which is hereinafter referred to as MG.

*Example 22.*—About 5 parts of product O are mixed with about 1 part of solid polymerized vinyl chloride. This mixture is heated in order to raise the temperature thereof between 275° F. and 325° F. and maintained at said temperature until substantially complete solution takes place. Then the solution is cooled and at 70° F. is a solid rubbery mass and is a gel which is hereinafter referred to as OG.

Novel and improved millable compositions and cured compositions are provided by employing the combination of (a) a rubbery substance selected from the group consisting of solid, rubbery polymers of chlorbutadiene, solid rubbery polymers of butadiene, solid rubbery copolymers of butadiene and styrene, solid rubbery copolymers of butadiene and acrylonitrile, natural rubber and reclaimed rubber and (b) a gel comprising a normally solid vinyl resin selected from the group consisting of the polymers of vinyl chloride, vinyl acetate, vinyl chloracetate and vinyl acetals, and copolymers of vinyl chloride and vinyl acetate such as vinyl butyral, etc., and one or a combination of two or more of said organic condensation products heretofore disclosed and examples of which are herewith set forth as products A—O inclusive. Other materials may be employed in said combination, and some of them are "Gastex" and "P-33" which are carbon blacks, "Speedon," "Altax" and "Tuads" which are vulcanization agents and accelerators, and "Aminox" which is an antioxidant. The relative quantity of said novel gel to the quantity of said rubbery substance in said combination may vary over comparatively wide limits, and is preferably such that the ratio of the quantity of said rubbery substance by weight to quantity by weight of the resin in said gel is between about 50 to 1 and 2 to 1. Millable compositions having improved tear resistance properties may be produced by mixing a quantity of (a) together with a quantity of (b) on a rubber mill. The following general example is illustrative of this phase of the invention.

*Example 23.*—A quantity of a rubbery substance of the aforesaid (a) class was gradually added to a quantity of a gel of the aforesaid (b) class while the latter was being masticated on a differential speed roll mill, the rolls of which were maintained at a temperature approximately about 120° F. Milling is continued until there is an intimate admixture of these substances. Then this intimate mixture may be stripped off the rolls as sheets and used as such. If desired, a quantity of a vulcanizing agent, accelerator and reinforcing materials as well as other material used in the compounding of rubber may be added to said mixture and dispersed therethrough on said rubber mill. This product is then sheeted and cured in the usual manner.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect by Letters Patent is:

1. A composition of matter comprising a normally solid material selected from the group consisting of polymerized vinyl chloride, polymerized vinyl acetate, polymerized vinyl chloracetate, polymerized vinyl butyral and copolymers of vinyl chloride and vinyl acetate and a normally liquid organic condensation reaction product of formaldehyde and a tertiary alkyl alcohol, said normally solid material being dissolved in said organic condensation reaction product, said composition of matter being in the state of a gel up to about 200° F., said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

2. A composition of matter comprising normally solid polymerized vinyl chloride and a normally liquid organic condensation reaction product of formaldehyde and a tertiary alkyl alcohol, said polymerized vinyl chloride being dissolved in said organic condensation reaction product, said composition of matter being in the state of a gel up to about 200° F., said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

3. A composition of matter comprising normally solid polymerized vinyl acetate and a normally liquid organic condensation reaction product of formaldehyde and a tertiary alkyl alcohol, said polymerized vinyl acetate being dissolved in said organic condensation reaction product, said composition of matter being in the state of a gel up to about 200 F., said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

4. A composition of matter comprising a normally solid copolymer of vinyl chloride and vinyl acetate and a normally liquid organic condensation reaction product of formaldehyde and a tertiary alkyl alcohol, said copolymer being dissolved in said organic condensation reaction product, said composition of matter being in the state of a gel up to about 200° F., said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

5. A millable composition comprising an intimate mixture of (a) a substance selected from the group consisting of rubber, rubbery polymers of chloroprene, rubbery polymers of butadiene, rubbery copolymers of butadiene and acrylonitrile and rubbery copolymer of butadiene and styrene and (b) a gel comprising a normally solid resin selected from the group consisting of polymerized vinyl chloride, polyvinyl acetate, polyvinyl chloride and vinyl acetate, polyvinyl butyral and copolymers of vinyl chloride and vinyl acetate and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

6. A millable composition comprising an intimate mixture of (a) a substance selected from the group consisting of rubber, rubbery polymers of chloroprene, rubbery polymers of butadiene, rubbery copolymers of butadiene and acrylonitrile and rubbery copolymers of butadiene and styrene and (b) a gel comprising polyvinyl chloride and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

7. A millable composition comprising an intimate mixture of (a) a substance selected from the group consisting of rubber, rubbery polymers of chloroprene, rubbery polymers of butadiene, rubbery copolymers of butadiene and acrylonitrile and rubbery copolymers of butadiene and styrene and (b) a gel comprising polyvinyl acetate and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

8. A millable composition comprising an intimate mixture of (a) a substance selected from the group consisting of rubber, rubbery polymers of chloroprene, rubbery polymers of butadiene, rubbery copolymers of butadiene and acrylonitrile and rubbery copolymers of butadiene and styrene and (b) a gel comprising a copolymer of vinyl chloride and vinyl acetate and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

9. The method comprising under the influence of heat dissolving one into the other a normally solid resin selected from the group consisting of polymerized vinyl chloride, polymerized vinyl acetate, polymerized vinyl chloracetate, polymerized vinyl butyral and copolymers of vinyl chloride and vinyl acetate and a normally liquid organic condensation reaction product of formaldehyde and a tertiary alkyl alcohol and then cooling said solution, said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

10. The method comprising under the influence of heat dissolving one into the other polymerized vinyl chloride and a normally liquid organic condensation reaction product of formaldehyde and a tertiary alkyl alcohol and then cooling said solution, said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

11. The method comprising under the influence of heat dissolving one into the other polymerized vinyl acetate and a normally liquid organic condensation reaction product of formaldehyde and a tertiary alkyl alcohol and then cooling said solution, said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

12. The method comprising under the influence of heat dissolving one into the other a copolymer of vinyl chloride and vinyl acetate and a normally liquid organic condensation reaction product of formaldehyde and a tertiary alkyl alcohol and then cooling said solution, said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

13. The method comprising milling a mixture of (a) a material selected from the group consisting of rubber, rubbery polymers of chloroprene, rubbery polymers of butadiene, rubbery copolymers of butadiene and acrylonitrile and rubbery copolymers of butadiene and styrene and (b) a gel comprising a normally solid resin selected from the group consisting of polymerized vinyl chloride, polyvinyl acetate, polyvinyl chloracetate, polyvinyl butyral and copolymers of vinyl chloride and vinyl acetate and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

14. The method comprising milling a mixture of (a) a material selected from the group consisting of rubber, rubbery polymers of chloroprene, rubbery polymers of butadiene, rubbery copolymers of butadiene and acrylonitrile and rubbery copolymers of butadiene and styrene and (b) a gel comprising normally solid polyvinyl chloride and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

15. The method comprising milling a mixture of (a) a material selected from the group consisting of rubber, rubbery polymers of chloroprene, rubbery polymers of butadiene, rubbery copolymers of butadiene and acrylonitrile and rubbery copolymers of butadiene and styrene and (b) a gel comprising normally solid polyvinyl acetate and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

16. The method comprising milling a mixture of (a) a material selected from the group consisting of rubber, rubbery polymers of chloroprene, rubbery polymers of butadiene, rubbery copolymers of butadiene and acrylonitrile and rubbery copolymers of butadiene and styrene and (b) a gel comprising a normally solid copolymer of vinyl chloride and vinyl acetate and a normally liquid organic condensation reaction product of formaldehyde and a tertiary alkyl alcohol said condensation product with at least 50% thereof being incapable of boiling below about 150° C. and produced by heating together from 1 to 8 moles of aqueous formaldehyde and one mole of a tertiary alcohol selected from the group consisting of tertiary amyl alcohol, tertiary butyl alcohol and tertiary hexyl alcohol, in the presence of a mineral acid.

MORTIMER T. HARVEY.